Sept. 8, 1970  M. J. O'NEILL  3,527,923
SINGLE ELEMENT HEATER ARRANGEMENT FOR AN ANALYTICAL INSTRUMENT
Filed Oct. 5, 1967  2 Sheets-Sheet 1
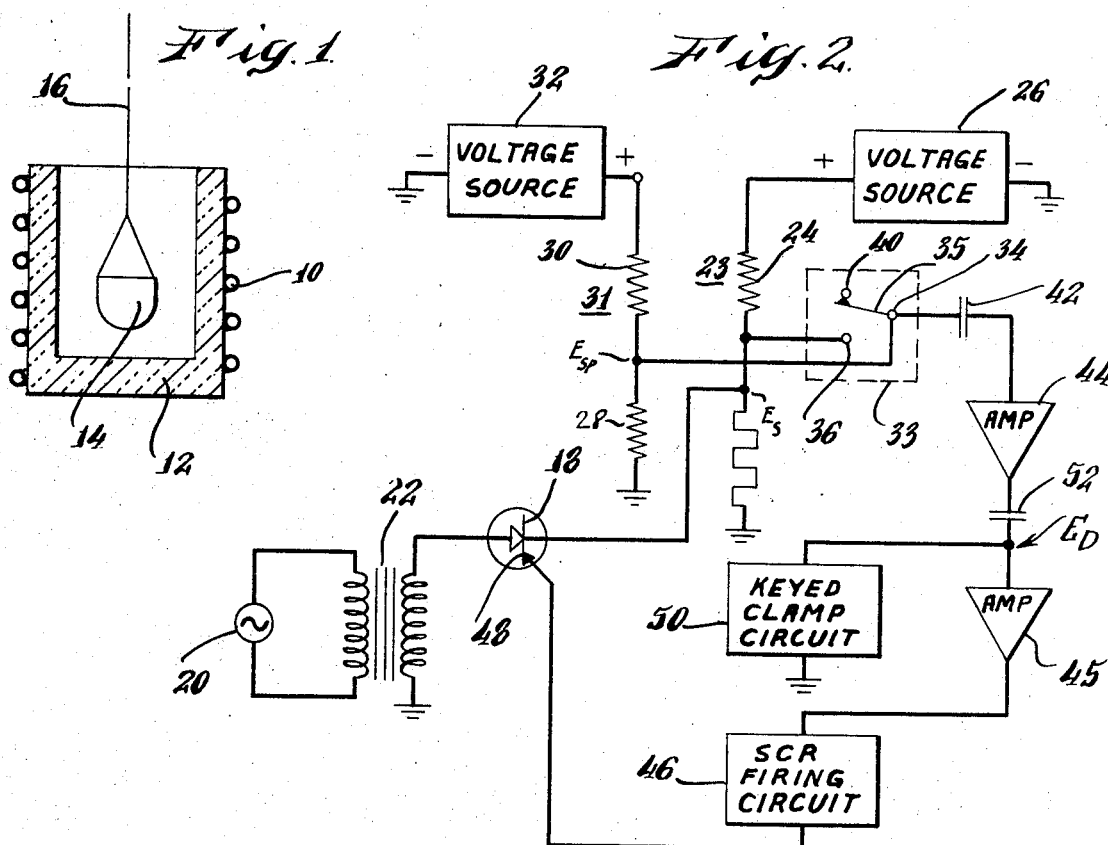
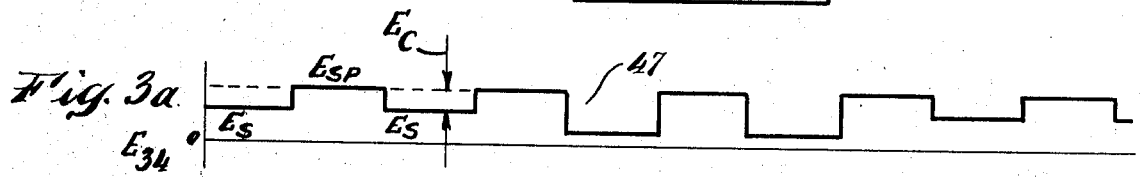
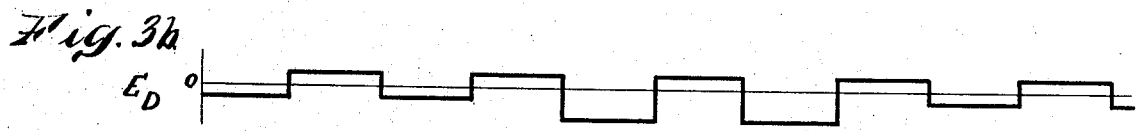
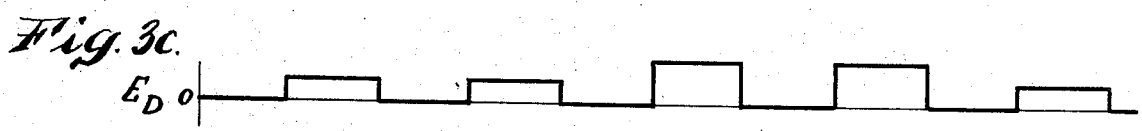
INVENTOR.
Michael J. O'Neill
BY
Frank J. Thompson
ATTORNEY.

United States Patent Office 3,527,923
Patented Sept. 8, 1970

3,527,923
SINGLE ELEMENT HEATER ARRANGEMENT
FOR AN ANALYTICAL INSTRUMENT
Michael John O'Neill, Newtown, Conn., assignor to The
Perkin-Elmer Corporation, Norwalk, Conn., a corporation of New York
Filed Oct. 5, 1967, Ser. No. 673,040
Int. Cl. H05b 1/02
U.S. Cl. 219—497                                    2 Claims

ABSTRACT OF THE DISCLOSURE

An analytical instrument includes a resistive heater element positioned with respect to a sample and adapted for heating the sample when a current flows in the heating element. Circuit means are provided for establishing a voltage $E_{sp}$ representative of a setpoint temperature $T_{sp}$ to which the sample is to be heated and circuit means, including the element, generate a voltage $E_s$ representative of the temperature $T_s$ of the sample. Means are provided for generating an alternating signal having a characteristic thereof proportional to a difference in the amplitude of the voltages $E_{sp}$ and $E_s$ and for causing a heating current having an average heating value proportional to the signal characteristic to flow in the element. With this arrangement, the resistive heating element additionally functions as a sensing element and advantageously reduces heater-sensor lag.

---

This invention relates to analytical instruments of the type wherein a sample under analysis is heated over a range of temperatures for observation of the physical characteristics of the sample. The invention relates more particularly to an improved arrangement for heating and for sensing the temperature of the sample.

In various analytical instruments such as a Differential Scanning Calorimeter and a Thermal Gravimetric Analysis apparatus, a sample being analyzed is heated in order to determine the temperature, or range of temperatures, at or over which physical variations occur in the sample. These variations can include a change in phase, oxidation, a variation in weight, etc. In order to assure that the results are of analytical value, the heating must be accompanied by a relatively accurate sensing of the sample temperature.

In prior heating and temperature sensing arrangements, the sample has been heated by applying electrical energy to a resistive heating element while the sample temperature is sensed by an independent resistive sensing element or by a thermocouple element. One arrangement employs a relatively small furnace adapted to receive a sample container and includes resistive heating and temperature sensing elements positioned in the furnace relative to the sample container. In another form, the temperature sensing element comprises a thermocouple positioned near, but at times, spaced away from the furnace. These arrangements suffer from one or more defects including heater-sensor thermal lag, electrical leakage, relatively large sample holder capacity, difficulties in furnace fabrication, and relative complexity and cost of associated circuitry.

Accordingly, it is an object of the present invention to provide an improved sample heating and temperature sensing arrangement for an analytical instrument.

Another object of the invention is to provide a sample heating and temperature sensing arrangement which overcomes one or more of the aforementioned disadvantages.

A further object of the invention is to provide in an analytical instrument adapted for heating a sample, a heating and temperature sensing arrangement utilizing a single resistive element for both heating and temperature sensing.

In accordance with a feature of the present invention, an analytical instrument includes a resistive heater element positioned with respect to a sample and adapted for heating the sample when a current flows in the heating element. Circuit means are provided for establishing a voltage $E_{sp}$ representative of a setpoint temperature $T_{sp}$ to which the sample is to be heated and circuit means, including the element, generate a voltage $E_s$ representative of the temperature $T_s$ of the sample. Means are provided for generating an alternating signal having a characteristic thereof proportional to a difference in the amplitude of the voltages $E_{sp}$ and $E_s$ and for causing a heating current havin gan average heating value proportional to the signal characteristic to flow in the element. With this arrangement, the resistive heating element additionally functions as a sensing element and advantageously reduces heater-sensor lag as well as other disadvantages enumerated hereinbefore.

These and other features and objects of the invention will become apparent with reference to the following specification and drawings wherein:

FIG. 1 is a diagram of a furnace for use in an analytical instrument illustrating a single element heater arrangement in accordance with the present invention;

FIG. 2 is a circuit diagram, partly schematic and partly in block form, illustrating a heater-sensor circuit arrangement in accordance with the present invention;

FIG. 3 is a diagram of electrical waveforms occurring in the circuit of FIG. 2.

Figure 4:
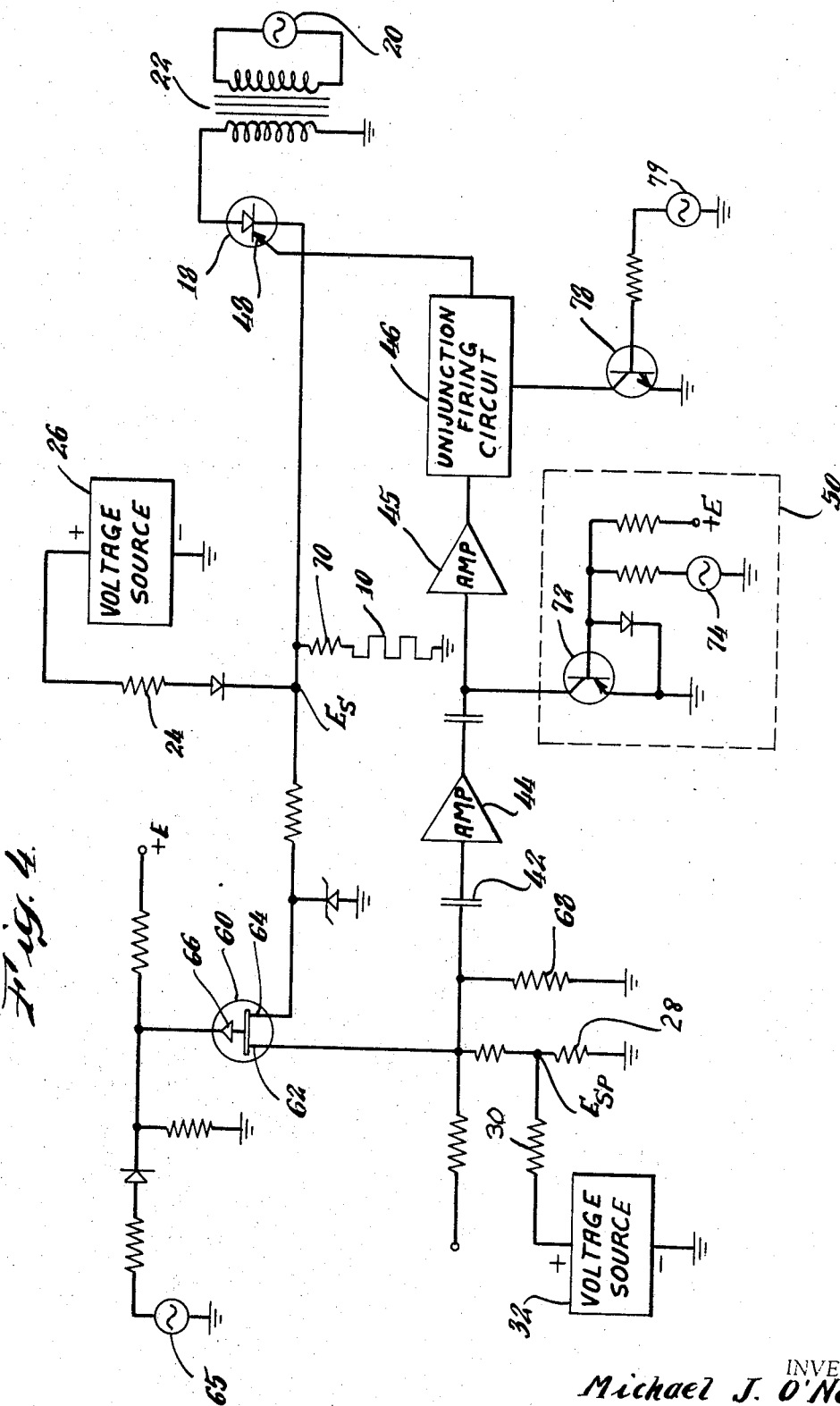
FIG. 4 is a schematic diagram illustrating one form of the circuit arrangement of FIG. 2 in greater detail.

Referring now to FIG. 1, a heater element 10 formed of a resistive heater material such as platinum wire is shown wound in helical form about an outer surface of a furnace 12. The furnace which is illustrated in sectional form is generally cylindrically shaped and fabricated of a refractory material such as beryllium oxide. A sample container 14 is provided for supporting a sample in the furnace. The sample container comprises a pan supported by any conventional means. For example, a wire 16 suspends the container from a balance arm of a TGA apparatus. A sample under analysis is deposited in the container and since the heater element 10 is positioned with respect to the sample under analysis, the sample will be heated to desired temperatures.

A circuit arrangement for periodically energizing the heater element and for sensing and controlling the temperature of the sample is illustrated in FIG. 2. Electrical heating eenrgy is applied to the heating element 10 during one portion of a heating-sensing cycle while temperature sensing is performed during another portion of the cycle. The heating element 10 is shown coupled to a silicon controlled rectifier 18. Electrical energy for heating the element is derived from an alternating current source 20 and is coupled to the heating element via a transformer 22 and the SCR 18. The element 10 is also series coupled in a voltage divider circuit 23 with a resistive impedance 24 and a source of DC potential 26. A DC sensing current flows in this series circuit and establishes a voltage drop $E_s$ across the element 10. This voltage varies in amplitude in accordance with the resistance of the element 10. As the heater element increases in temperature, its resistance increases accordingly. Since a platinum heater element exhibits a substantially linear resistance-temperature characteristic, the voltage $E_s$ will be linearly related to the temperature of the element 10. The voltage $E_s$ will therefore be a relatively accurate representation of the sample temperature.

The desired setpoint temperature $T_{sp}$ to which the sample is to be heated is represented by a voltage drop $E_{sp}$ (FIG. 2) across a resistive impedance 28 of a voltage divider 31. The setpoint voltage is established by an output control voltage applied to the voltage divider from a source 32. This output control voltage comprises a DC voltage or a varying DC voltage which varies slowly in amplitude in a predetermined manner, over a period of time. In the latter case, the voltage source 32 represents a programmed output voltage from an analytical instrument such as a differential scanning calorimeter of a type described in U.S. Pat. 3,263,484.

Circuit means for generating an alternating voltage having an amplitude proportional to a difference in the amplitudes of the voltages $E_{sp}$ and $E_s$ includes a chopper 33 of the electromechanical or electronic type. In FIG 2 the chopper 33 comprises a conventional electromechanical vibrator and for purposes of clarifying the drawing, only the chopper contacts of particular interest are shown. A terminal 34 of a chopper swinger arm 35 is coupled to the voltage divider 31. The swinger arm 35 is periodically switched between terminal 36 and an unused terminal 40 at a 60-cycle rate, for example. Electrical heating energy is applied to the element 10 during that portion of the cycle when swinger arm 35 makes contact with terminal 40. More particularly, the swinger arm 35 is timed to break contact with terminal 36 before heating energy is applied to the element 10 and to make contact during that portion of the cycle after the application of heater energy has been terminated. An output impedance of the voltage divider circuit 23 is substantially less than an output impedance of the voltage divider circuit 31. The impedance ratio $Z_{23}/Z_{31}$ is on the order of 1:10, for example. The relatively low impedance voltage divider 23 is therefore primarily determinative of the voltage at terminals 34 and 36 when the swinger arm 35 contacts terminal 36. A voltage $E_s$ will then appear at terminal 34 as the swinger 35 makes contact with the terminal 36. As the swinger 35 breaks contact with terminal 36 and contacts terminal 40, the low impedance network 23 is decoupled from terminal 34 and the voltage $E_{sp}$ will appear at terminal 34. By periodically making and breaking contact with terminal 36, a DC voltage having an alternating component $E_s$ which is representative of the difference in amplitude between the voltages $E_{sp}$ and $E_s$ is thereby generated. A typical waveform of the voltage at terminal 34 is shown in FIG. 3a. A capacitor 42, (FIG. 2), couples this coltage to an amplifier stage 44 and blocks the transmission of the DC component. An alternating voltage having a peak-to-peak amplitude representative of the voltage ($E_{sp}$–$E_s$) is thereby provided.

This alternating voltage is amplified by stage 44 and coupled via a DC amplifier 45 to an SCR control circuit 46. The waveform of the alternating voltage $E_d$ as applied to amplifier 45 is illustrated in FIG. 3b. As indicated hereinbefore, heating power is applied to the element 10 in accordance with the amplitude of the AC signal $E_c$. The firing circuit 46 effects an amplitude to phase conversion for controlling the conduction of the SCR and the application of heater energy. As the temperature of the element 10 approaches the setpoint temperature $T_{sp}$, the voltage $E_s$ approaches $E_{sp}$ in amplitude and the signal $E_c$ decreases in amplitude toward zero volts. The feedback loop then provides for the automatic application of power to the element 10 for maintaining the setpoint temperature $T_{sp}$.

When a sudden change in the sample temperature occurs, the average value of the voltage $E_d$ initially tends to vary in a manner for cancelling the effect of this change during that half-cycle when the chopper swinger 35 is in contact with terminal 40. Thus the instantaneous voltage $E_d$ initially remains unchanged and there is no change in the heater power. To avoid this result, the voltage $E_d$ is clamped to ground every half-cycle. The current then responds instantly to changes in temperature. In FIG. 3a, the half-cycle 47 represents a sudden change in heating temperature. FIGS. 3b and 3c indicate the corresponding waveforms without and with clamping, respectively. The arrangement of FIG. 2 includes a keyed clamp circuit 50, and, a capacitor 52 is provided for clamping the signal, $E_d$, which is applied to the DC amplifier 45, to ground potential during the temperature sensing portion of the cycle. The duration of clamping is on the order of 80°. FIG. 3c illustrates the clamped voltage at the input to amplifier 45.

A heating and temperature sensing circuit arrangement in accordance with the present invention and having an electronic chopper circuit arrangement is illustrated in detail in FIG. 4. Elements in FIG. 4 performing similar functions as those enumerated with respect to FIG. 1 bear the same reference numerals. The chopper 33 includes a field-effect transistor 60 having the setpoint voltage $E_{sp}$ applied to an electrode 62 thereof and the voltage $E_s$ applied to an electrode 64. A periodic keying signal is derived from a line voltage source 65 and is applied to the electrode 66 for periodically driving the transistor 60 into conduction and cutoff. During the cut-off state a high impedance exists between the electrodes 62 and 64. The voltage $E_{sp}$ is then developed across a load resistance 68 and is applied to the amplifier 44. When the transistor is keyed to thereby provide a relatively low impedance between the electrodes 62 and 64, the voltage $E_s$ appears across the load resistance 68. The transistor 60 is driven into conduction for approximately 130° during the temperature sensing portion of the cycle. This is accomplished by applying a relatively high positive voltage to the electrode 66 via resistor 67. In generating the voltage $E_s$, a resistor 70 having a value on the order of one ohm is provided and coupled in series with the element 10. This resistor decreases the apparent temperature coefficient of the platinum element and thereby compensates for any small differential in temperature between the sample and the oven.

The keyed clamp circuit 50 includes a transistor 72 and a keying source 74 for periodically driving the transistor into conduction and cutoff. Operation of the keyed clamp is well known and further elaboration is believed unnecessary. An output voltage from the DC amplifier 45 is coupled to the unijunction firing circuit 46. This circuit includes the usual timing capacitor for determining the magnitude of phase angle conduction for the SCR 18 as well as a suitable SCR driving transistor. The amplitude of the AC signal, which is converted to a phase variation by this circuit, determines the length of time during which the SCR 18 is conductive and heater power is applied to element 10. This is automatically effected by a varying DC voltage which is coupled from the DC amplifier 45 to the timing capacitor. A transistor 78 which is periodically keyed at the end of the heating cycle by a source 79 functions to discharge the timing capacitor of the unijunction firing circuit. In a particular arrangement, the frequency of chopper keying, clamp keying and discharge of the timing capacitor is equal to the frequency of line source 20. Circuit arrangements of this type are known and are discussed in detail in the SCR Manual, 2nd Edition, 1961, General Electric Company, Auburn, N.Y.

A heater-sensor arrangement for use with an analytical instrument requiring a single element for both heating and temperature sensing has thus been described. This arrangement is advantageous in that it eliminates heater-sensor lag and avoids other operating and fabrication problems previously encountered.

While I have illustrated and described a particular embodiment of my invention, it will be understood that various modifications may be made therein without departing from the spirit of the invention and the scope of the appended claims.

I claim:

1. In an analytical instrument, a circuit arrangement for heating a sample under analysis to a desired temperature comprising:
    a resistive heater element positioned with respect to the sample for heating the sample when a current flows in said element;

circuit means including a source of DC voltage and a resistive impedance coupled in series with said element for establishing a voltage drop $E_s$ across said element;

circuit means for providing a set point voltage $E_{sp}$ which is representative of a desired temperature to which the heater element is to be heated;

switching circuit means adapted for providing an alternating output signal having an amplitude proportional to a difference in amplitude between a first and a second input voltage;

means for applying $E_{sp}$ and the voltage $E_s$ to said switching means;

amplifying means for amplifying said signal;

a silicon control rectifier coupled to said element;

a source of electrical energy coupled to said rectifier and adapted for periodically applying heating energy to said element; and, circuit control means coupled between said amplifying means and said silicon control rectifier for causing said rectifier to conduct during each cycle for a period of time for applying to said element electrical power having an average magnitude proportional to the amplitude of the alternating signal.

2. The apparatus of claim 1 including a clamping circuit means for clamping said alternating signal to a reference potential.

References Cited
UNITED STATES PATENTS

| | | | |
|---|---|---|---|
| 3,256,734 | 6/1968 | Storke | 219—497 |
| 3,375,347 | 3/1968 | Seney | 219—497 |

BERNARD A. GILHEANY, Primary Examiner

F. E. BELL, Assistant Examiner